Patented Oct. 13, 1942

2,299,013

UNITED STATES PATENT OFFICE 2,299,013

CATALYTIC OXIDATION OF KETONES

Walter Flemming, Ludwigshafen-on-the-Rhine, Germany, assignor, by mesne assignments, to General Aniline & Film Corporation, New York, N. Y., a corporation of Delaware No Drawing. Application March 1, 1940, Serial No. 321,767. In Germany March 1, 1939

4 Claims. (Cl. 260—537)

The present invention relates to a process for the production of organic acids by the catalytic oxidation of ketones.

It is known to carry out the liquid-phase oxidation of ketones to acids by means of oxygen or gases containing oxygen in the presence of oxidation catalysts, such as manganese, cobalt, copper and iron, which metals are used in the form of their oxides or carbonates or chemically combined with acetic acid or with other organic compounds, as for example in the form of the acetyl acetonates.

I have now found that the liquid-phase oxidation of ketones may be carried out with special advantage while using the metals acting as oxidation catalysts in the form of their nitrates. The advantage obtained by this method of working resides in a more rapid course of the reaction and hence in better yields per unit of space and time. Since the use of the said nitrate catalysts also presents the possibility of working at lower temperatures, the oxidation to carbon dioxide, being but slight even in the former method of oxidation, is still more reduced. When oxidizing for example methylethyl ketone in the presence of a known catalyst and with the aid of a nitrate catalyst in accordance with my invention, respectively, under otherwise identical working conditions, the yield of acids is about 25 grams per day and per each square centimeter of the cross-section of the reaction vessel, in the case of the known catalyst, but 40 grams or even more in the case of the nitrate catalyst according to my present invention. In reactions with other ketones the results are similar or even better.

Suitable catalysts are the nitrates of all metals the compounds of which influence favorably the oxidation of organic compounds, for example the nitrates of manganese, iron, cobalt, nickel, copper, uranium, vanadium, cerium and chromium, as well as mixtures of these nitrates with one another or with other substances, for example with indifferent substances. Instead of the ready-made nitrates themselves, the metals also may be used together with nitric acid either by themselves or in the form of chemical compounds which under the reaction conditions are converted into the metal nitrates by nitric acid; thus, for example, catalysts of the conventional type, such as manganese, cobalt or iron acetate or carbonate may be used together with concentrated nitric acid in the catalytic oxidation of ketones by means of oxygen or gases containing oxygen, such as air.

The oxidation of the ketones is advantageously carried out in a continuous manner, the oxidized ketone being continuously replaced by fresh ketone and the concentration of the ketone most favorable for the oxidation being maintained. The reaction mixture having undergone substantial conversion into acids is continuously or intermittently removed from the reaction vessel. In order to provide for the presence of the catalyst in the amount most suitable for the reaction, the catalyst may be replenished continuously or periodically. The process is carried out in the liquid phase between room temperature and the boiling point of the reaction mixture.

The following examples serve to illustrate how my present invention may be carried out in practice, but the invention is not restricted to these examples.

Example 1

A solution of 1 gram of manganese nitrate, 1 gram of copper nitrate and 1 gram of iron nitrate in 25 grams of glacial acetic acid, and 400 grams of methylethyl ketone are introduced into a cylindrical reaction vessel (40 centimeters in height and 5 centimeters in internal diameter) provided with a reflux condenser. While heating the vessel by means of a hot-water jacket, passing oxygen through the reaction material at a rate of 25 liters per hour from below through a glass filter plate is commenced. The oxygen current is led in a cycle and any oxygen consumed is replenished.

The absorption of oxygen sets in at between 60° and 65° C. By causing a cooling liquid to flow through the jacket the temperature is maintained at between 65° and 70° C. The quantity of oxygen consumed amounts to from 13 to 17 liters per hour. As soon as the absorption of oxygen ceases, 300 grams of methylethyl ketone and 2 grams of the same nitrate mixture as referred to above are slowly added. Whenever the absorption of oxygen subsides, from about two fifths to one half of the liquid contents of the reaction vessel are withdrawn at little above the glass filter plate and fresh ketone and proper quantities of catalyst are added from above. The circulating gas is renewed from time to time since gradually carbon monoxide and carbon dioxide and, if nitrogenous gas be used, nitrogen are enriched therein too strongly.

The low-boiling fractions of the reaction product which substantially consist of unchanged methylethyl ketone and some acetaldehyde and formaldehyde as well as slight proportions of diacetyl, are preferably returned to the oxidation process. When 750 grams of methylethyl ketone are employed per day 626 grams thereof are converted into 1042 grams of a mixture which consists of 81 per cent of acetic acid, 10 per cent of propionic acid, 6 per cent of formic acid and 3 per cent of water.

Example 2

Acetone is oxidized at between 68° and 75° C. while employing manganese nitrate as a catalyst in an initial quantity of 4 grams under otherwise the same conditions as specified in Example 1. The formation of carbon dioxide is a little stronger than in the oxidation of methylethyl ketone, whereas the absorption of oxygen per hour is slightly lower.

The yield of acids, calculated on the acetone reacted, amounts to 91 per cent of the theory. The oxidation mixture freed from unchanged acetone consists of about 60 per cent of acetic acid, 30 per cent of formic acid, 5 per cent of formaldehyde and 5 per cent of water. The formaldehyde which results in the form of paraformaldehyde may be obtained by itself or subjected again to oxidation together with the first fraction of the crude product consisting mainly of acetone, and may thus be converted into formic acid.

The same effect is obtained by employing 1 gram of iron or 1.5 grams of manganese acetate together with 3 cubic centimeters of concentrated nitric acid.

Example 3

A mixture of 300 grams of glacial acetic acid, 300 grams of cyclohexanone and 2 grams of manganese nitrate is treated with air substantially under the conditions disclosed in Example 1, the glass filter plate used therein for the distribution of the oxygen being more preferably replaced by a bulged glass tube provided with a great number of tiny openings having each about 1 millimeter in diameter. Any troubles caused by the crystallizing out of adipic acid are thus avoided. This glass device for introducing the oxygen is preferably arranged somewhat above the bottom of the vessel; thus below the openings of the distributing device there remains sufficient space for allowing the adipic acid crystals to settle without clogging the openings.

The reaction temperature is preferably kept at between 60° and 70° C. by cooling; once initiated the reaction may, however, also be carried out at lower temperatures, say between 25° and 30° C. The addition of the glacial acetic acid renders it possible to carry the oxidation to higher concentrations of adipic acid. Another advantage resides in that the adipic acid is obtained in a pure state.

After the adipic acid has crystallized out and has been separated from the reaction mixture which has been withdrawn from the reaction vessel, the glacial acetic acid is returned to the reaction vessel together with unconverted ketone. While from 20 to 23 liters of oxygen are consumed about 44 grams of cyclohexanone are oxidized per hour to form 65 grams of adipic acid. The yield of adipic acid amounts to from 95 to 97 per cent of the theory calculated on the amount of cyclohexanone converted.

What I claim is:

1. The process for the production of acids which comprises oxidizing a ketone in the liquid phase by means of a gas comprising oxygen in the presence of a nitrate of a metal which in the form of its oxide is useful as a catalyst in the oxidation of ketones to acids.

2. The process for the production of acids which comprises oxidizing a ketone in the liquid phase by means of a gas comprising oxygen in the presence of a small amount of a metal which in the form of its oxide is useful as a catalyst in the oxidation of ketones to acids, and a small amount of nitric acid adequate for converting the said metal into its nitrate.

3. The process for the production of acids which comprises oxidizing a ketone in the liquid phase by means of a gas comprising oxygen in the presence of a small amount of a compound of a metal which in the form of its oxide is useful as a catalyst in the oxidation of ketones to acids, and a small amount of nitric acid adequate for converting the said metal compound into the metal nitrate.

4. The process for the production of acids which comprises oxidizing a ketone in the liquid phase by means of a gas comprising oxygen in the presence of a nitrate of a metal which in the form of its oxide is useful as a catalyst in the oxidation of ketones to acids, said metal being selected from the class consisting of manganese, iron, cobalt, nickel, copper, uranium, vanadium, cerium and chromium.

WALTER FLEMMING.